(12) United States Patent
Lamb

(10) Patent No.: US 10,414,006 B2
(45) Date of Patent: Sep. 17, 2019

(54) RETURN BEND RINGING SYSTEM AND METHOD

(71) Applicant: Arrow Fabricated Tubing, Inc., Garland, TX (US)

(72) Inventor: Kenneth Ray Lamb, Garland, TX (US)

(73) Assignee: Arrow Fabricated Tubing, Inc., Garland, TX (US)

( * ) Notice: Subject to any disclaimer, the term of this patent is extended or adjusted under 35 U.S.C. 154(b) by 275 days.

(21) Appl. No.: 15/264,370

(22) Filed: Sep. 13, 2016

(65) Prior Publication Data

US 2018/0071811 A1  Mar. 15, 2018

(51) Int. Cl.
| | |
|---|---|
| *B23P 19/04* | (2006.01) |
| *B23P 15/26* | (2006.01) |
| *F28F 9/26* | (2006.01) |
| *F28D 1/047* | (2006.01) |
| *F28D 7/08* | (2006.01) |

(52) U.S. Cl.
CPC .............. *B23P 19/04* (2013.01); *B23P 15/26* (2013.01); *F28D 1/0477* (2013.01); *F28D 7/085* (2013.01); *F28F 9/268* (2013.01)

(58) Field of Classification Search
CPC .... B21D 39/04; B21D 39/046; B21D 39/048; B23K 3/06; B23K 3/0607; F22B 37/16; Y10T 29/4935; Y10T 29/49353; Y10T 29/49393; Y10T 29/53961; Y10T 29/5397; Y10T 29/53; Y10T 29/53113; Y10T 29/53126; Y10T 29/53383; Y10T 29/53396
See application file for complete search history.

(56) References Cited

U.S. PATENT DOCUMENTS

| | | | | | |
|---|---|---|---|---|---|
| 1,865,016 | A | * | 6/1932 | Kirkpatrick | C10G 9/20 285/135.1 |
| 2,120,067 | A | * | 6/1938 | Gray | B21C 37/28 228/165 |
| 3,704,035 | A | * | 11/1972 | Mayer | F16L 19/04 285/135.4 |
| 3,791,005 | A | * | 2/1974 | Moyer | B23K 3/06 228/33 |
| 4,459,917 | A | * | 7/1984 | Michael | B21D 53/085 165/150 |
| 4,584,751 | A | * | 4/1986 | Gray | B21D 53/085 29/523 |
| 4,706,365 | A | * | 11/1987 | Hooton | B21D 39/00 228/154 |
| 4,734,969 | A | * | 4/1988 | Currier | B21D 53/085 29/726 |
| 4,835,828 | A | * | 6/1989 | York | B21D 53/085 29/727 |

(Continued)

*Primary Examiner* — Tyrone V Hall, Jr.
(74) *Attorney, Agent, or Firm* — McGuireWoods LLP

(57) ABSTRACT

A return bend ringing apparatus includes a ring station configured to receive a pair of rings and a pair of pins configured to move between a retracted position and an extended position. Each pin includes a tapered end and a shoulder. The pins in the retracted position are configured not to engage the rings, and the pins in the extended position are configured to engage the rings with each pin extending through one of the rings. A gripper is configured to grip and move a return bend into an engagement position in which the return bend engages the shoulder of each pin.

15 Claims, 13 Drawing Sheets

(56) References Cited

U.S. PATENT DOCUMENTS

| | | | | |
|---|---|---|---|---|
| 5,487,294 A | * | 1/1996 | Petersen | B21D 17/02 |
| | | | | 72/306 |
| 5,581,883 A | * | 12/1996 | Matambo | F16L 55/027 |
| | | | | 29/890.035 |
| 6,405,428 B1 | * | 6/2002 | Mun | B21D 53/085 |
| | | | | 29/33 G |
| 6,530,144 B1 | * | 3/2003 | Hong | B21D 53/085 |
| | | | | 29/33 G |
| 2009/0200363 A1 | * | 8/2009 | Means | B23K 1/0012 |
| | | | | 228/246 |

* cited by examiner

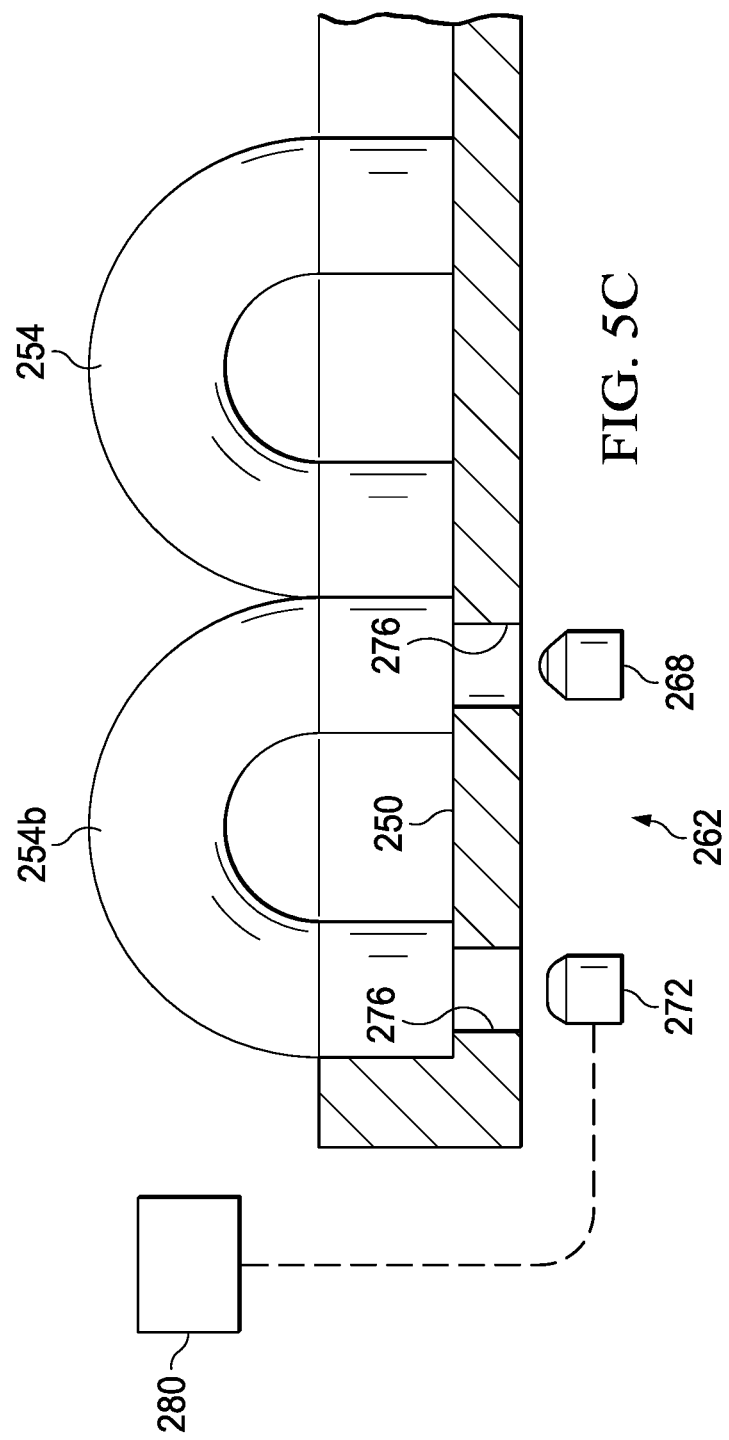

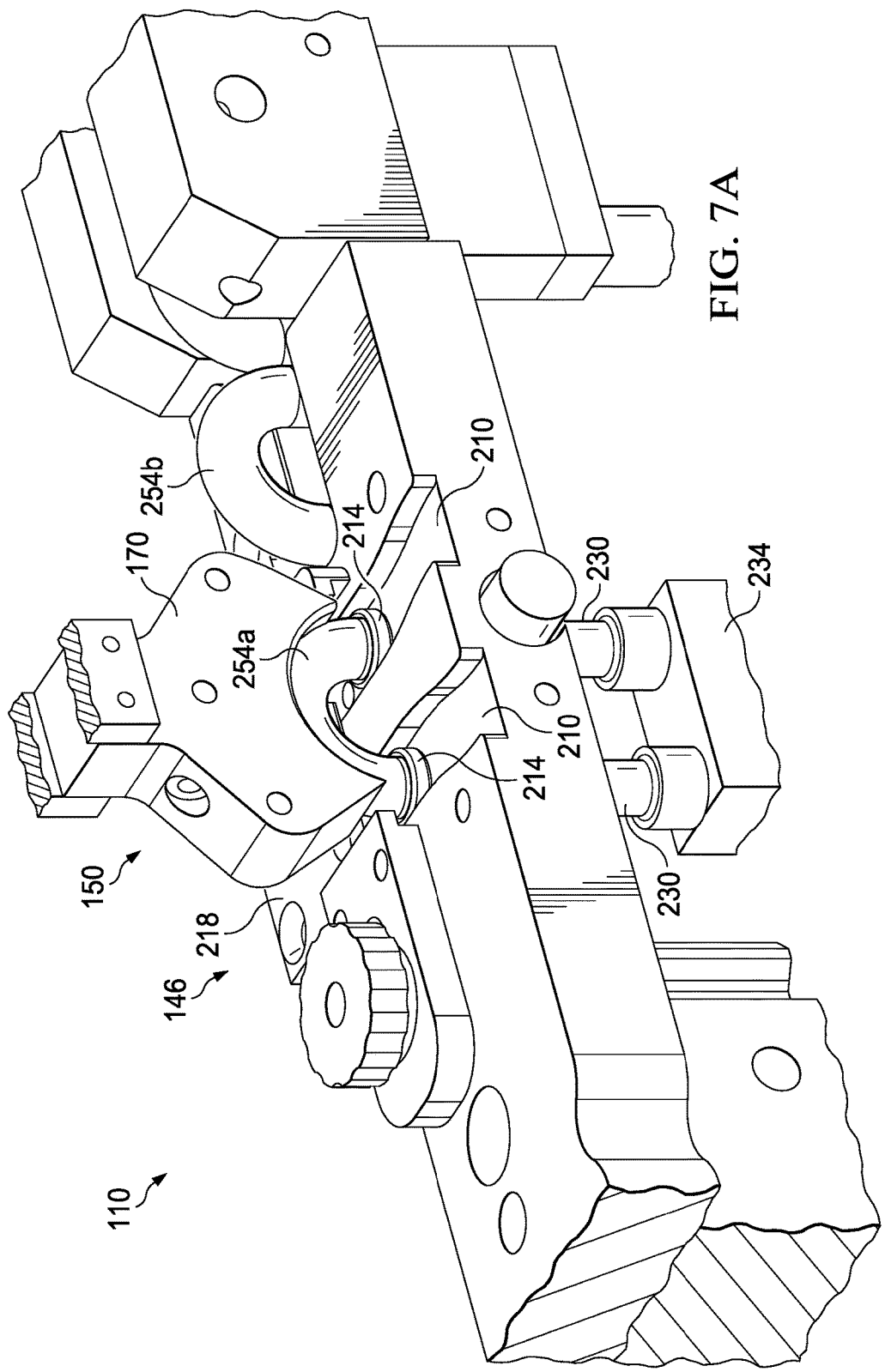

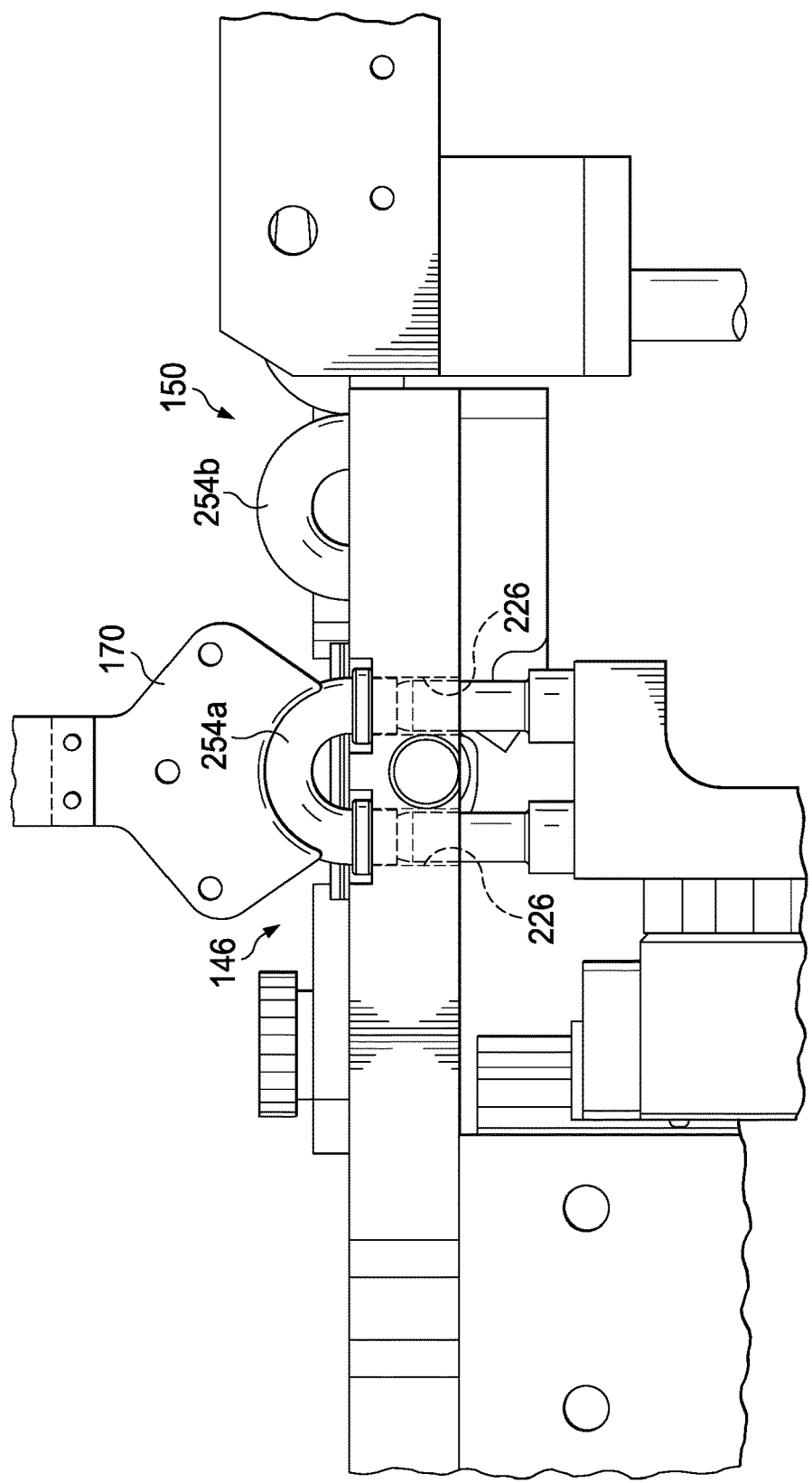

RETURN BEND RINGING SYSTEM AND METHOD

BACKGROUND

1. Field of the Invention

The invention relates generally to systems and methods for positioning rings on return bends used in fluid circulation systems such as heat exchangers.

2. Description of Related Art

Heat exchangers such as evaporators coils and condenser coils used in residential and commercial heating and cooling system typically include an array of tubes arranged and secured to allow fluid (i.e., liquid or air) flowing through the tubes to exchange heat with fluid flowing over an outside surface of the tubes. Often fins or other structural supports are positioned in contact with the tubes to further improve the heat transfer properties associated with the heat exchanger. In most cases, the tubes are arranged in rows or columns and are fluidly coupled to provide a continuous fluid path through the tubes. Tubes in adjacent columns or rows may be connected by return bends, which are relatively short, U-shaped tubing that include rings on the ends of the tubing. The ringed return bends allow heat exchanger manufacturers to more easily connect adjacent tubes by brazing, welding or otherwise fastening the ringed return bends to the tubes. When used to attach adjacent tubes, the return bend permits the fluid traveling through one tube to be smoothly directed into the adjacent tube and also causes the direction of fluid flow to change between the tubes.

Ringed return bends permit faster manufacturing of heat exchangers, but since the parts are often constructed from aluminum, copper and other soft metals, it can be difficult to provide quick production of the parts and ensure quality control.

SUMMARY

The problems presented by existing return bend ringing systems are solved by the systems and methods described herein. In one illustrative embodiment, a return bend ringing apparatus includes a ring station configured to receive a pair of rings, and a cover plate configured to reciprocate between an open position and a closed position. The cover plate in the closed position assists in securing the pair of rings at the ring station. A pair of pins is configured to move between a retracted position and an extended position. Each pin includes a tapered end and a shoulder. The pins in the retracted position are configured not to engage the rings, while the pins in the extended position are configured to engage the rings with each pin extending through one of the rings. The return bend ringing apparatus further includes a gripper configured to selectively grip a return bend. The gripper is configured to move the return bend between a home position and an engagement position in which the return bend engages the shoulder of each pin.

In another embodiment, a method of ringing a return bend includes moving a pin through a ring and into an extended position to position the ring to receive a leg of the return bend, moving the return bend to engage the pin with the leg of the return bend, and continuing to move the pin toward a retracted position by moving the return bend such that the leg of the return bend is received by the ring.

In yet another embodiment, a return bend ringing apparatus includes a ring station configured to receive a pair of rings and a pair of pins configured to move between a retracted position and an extended position. Each pin includes a tapered end and a shoulder. The pins in the retracted position are configured not to engage the rings, while in the extended position, the pins are configured to engage the rings with each pin extending through one of the rings. A gripper is configured to grip and move a return bend into an engagement position in which the return bend engages the shoulder of each pin.

In another embodiment, a return bend ringing apparatus includes a part station configured to receive a return bend having an inner passage with a first opening and a second opening. A light source is configured to direct a light into the first opening of the inner passage, and a light detector is configured to detect the light near the second opening. The apparatus further includes a controller configured to determine based on the light detected near the second opening at least one of (1) the proper positioning of the return bend at the part station, and (2) the absence of blockages in the inner passage of the return bend.

Other objects, features, and advantages of the illustrative embodiments will become apparent with reference to the drawings, detailed description, and claims that follow.

BRIEF DESCRIPTION OF THE DRAWINGS

FIG. 5C illustrates a presence and obstruction detection system of the return bend ringing system taken at 5C of FIG. 5B;

FIG. 7A illustrates an isometric view of a ringing station and a part station of the return bend ringing system of FIG. 1 in an operational configuration;

FIG. 7B illustrates a front view of the return bend ringing system in the operational configuration of FIG. 7A;

DETAILED DESCRIPTION OF THE ILLUSTRATIVE EMBODIMENTS

In the following detailed description of several illustrative embodiments, reference is made to the accompanying drawings that form a part hereof, and in which is shown by way of illustration specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

As used herein, the phrases "hydraulically coupled," "hydraulically connected," "in hydraulic communication," "fluidly coupled," "fluidly connected," and "in fluid communication" refer to a form of coupling, connection, or communication related to fluids, and the corresponding flows or pressures associated with these fluids. In some embodiments, a hydraulic coupling, connection, or communication between two components describes components that are associated in such a way that fluid pressure may be transmitted between or among the components. Reference to a fluid coupling, connection, or communication between two components describes components that are associated in such a way that a fluid can flow between or among the components. Hydraulically coupled, connected, or communicating components may include certain arrangements where fluid does not flow between the components, but fluid pressure may nonetheless be transmitted such as via a diaphragm or piston or other means of converting applied flow or pressure to mechanical or fluid force.

Figure 1:
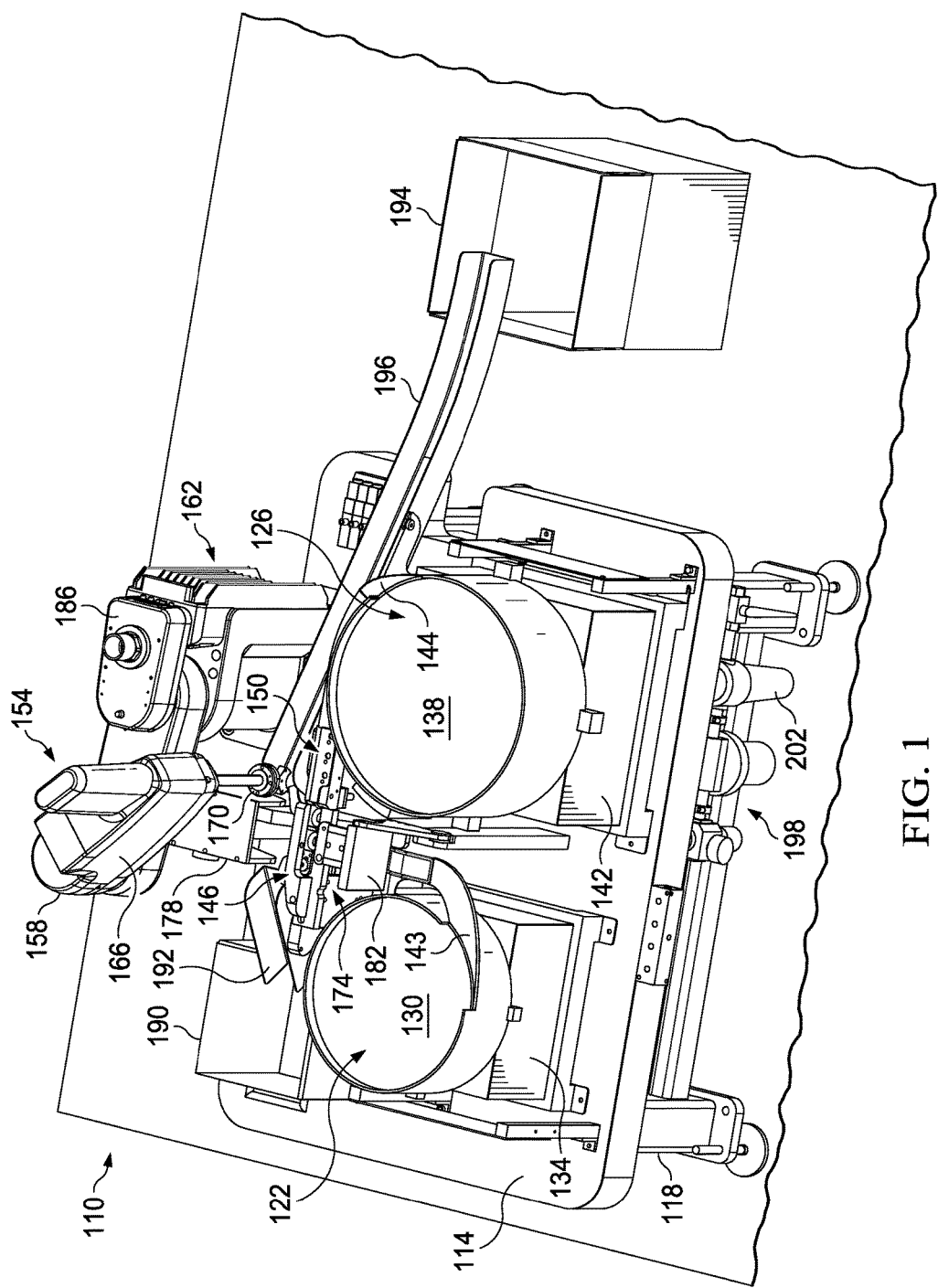
FIG. 1 illustrates an isometric view of a return bend ringing system according to an illustrative embodiment.

FIG. 1 illustrates an isometric view of a return bend ringing system 110 according to an illustrative embodiment. The return bend ringing system 110 includes a base 114 supported by a frame assembly 118. The base 114 may be coupled to portions of the frame 114 assembly by fasteners, welding, bonding, or in other ways to secure and prevent the base 114 from moving during operation of the return bend ringing system 110. The base may be generally rectangular in shape, but alternatively could be any shape or size that allows support of the various components of the return bend ringing system 110 described herein.

A first feed assembly 122 and a second feed assembly 126 are each positioned on and coupled to the base 114. In one embodiment, the first feed assembly 122 includes a first feed bowl 130 coupled to a first vibratory source 134. Similarly, the second feed assembly 126 includes a second feed bowl 138 coupled to a second vibratory source 142. The first and second vibratory sources 134, 142 are capable of advancing parts in the first and second feed bowls 130, 138, respectively, such that the parts are delivered from the bowls through first and second ramps 143, 144 to other locations associated with the ringing process. The vibratory sources and feed bowls may also provide the ability to properly orient the parts as the parts are moved toward or on the ramps 143, 144. While multiple vibratory sources 134, 142 are illustrated in FIG. 1, a single vibratory source could instead be operatively coupled to the base 114 or the first and second feed bowls 130, 138 to provide the necessary motive force to move the parts from the feed bowls. In other embodiments, other types of feed bowls may be used in place of the vibratory-type feed bowls. For example, feed bowls that employ a gravity-type feed mechanism or an internal agitation member may be used. Any type of suitable material handling assembly may be used in place of the feeds bowls 130, 138 illustrated in FIG. 1. Examples of such assemblies include conveyor belts, rotary hopper bowl and track feed systems, and linear vibratory feed systems.

In addition to the first and second feeds bowls 130, 138, the return bend ringing system 110 includes a ringing station 146 and a part station 150. Rings that are contained in the first feed bowl 130 are configured to move via the first ramp 143 to the ringing station 146. Return bends that are contained in the second feed bowl 138 are configured to move via the second ramp 144 to the part station 150. The ringing station 146 and the part station 150 are illustrated and described in more detail in FIGS. 2-8. Both the ringing station 146 and the part station 150 include components that are supported by the base 114.

A robotic assembly 154 includes at least one motor 158, a controller 162, an arm 166, and an end effector, or gripper 170 that together are capable of moving return bends or rings to complete the ringing and inspection processes by the return bend ringing system 110. In one embodiment, the robotic assembly 154 may be an eCobra 600 PLC Scara Robot manufactured by Adept Technology, Inc. The controller 162 is capable of processing data and directing the operation of the at least one motor 158. In some embodiments, the controller 162 receives signals from various sensors associated with the return bend ringing system 110 prior to making determinations about the operation of the at least one motor 158. The operation of the at least one motor 158 by the controller 162 may be directed by signals sent from the controller 162 to the motor 158. In some embodiments, the at least one motor 158 may be a plurality of motors that permit movement of the arm 166 or gripper in multiple directions or rotations about multiple axes. The arm 166 is operably connected to the at least one motor 158 such that the arm 166 may be rotated or otherwise moved to position the gripper 170. As described in more detail below, the gripper 170 is capable of engaging and moving the return bends from the part station 150 to the ringing station 146, ringing the return bends with rings, moving the ringed return bend (i.e., the completed part) to an inspection position or location, and then moving the ringed return bend to a final part box. In the embodiment illustrated in FIGS. 1-8, the gripper 170 is a vacuum-type gripper that is operably connected to a pneumatic system. The pneumatic system provides a reduced pressure to the gripper to selectively hold the part and then a positive pressure to selectively release the part. In other embodiments, the gripper 170 may grip the part using a mechanical or motive arms, magnetic attraction (if ferro-magnetic parts are being gripped), or other methods of grasping the part.

Referring still to FIG. 1, the return bend ringing system 110 also includes an inspection system 174 to inspect the completed part following application of the rings to the return bend. The inspection system 174 includes a camera 178 and a light source 182 to illuminate and capture an image of the ringed return bend. A processor 186, which may be associated with the camera 178 or may be separate from the camera 178, may be used to compare the image of the ringed return bend to a stored image of an acceptable ringed return bend such that a determination may be made to accept or reject the completed part. A reject box 190 is coupled to the base 114 and a reject chute 192 is positioned in proximity to the reject box 190. The reject chute 192 is configured to receive completed parts that do not pass the inspection by the inspection system 174 and deliver the completed parts to the reject box 190. A part box 194 is coupled to the base 114 or is positioned adjacent the frame assembly 118. A part chute 196 may be anchored to the base 114 with one end positioned in proximity to the part box 194. The part chute 196 is configured to receive completed parts that pass the inspection by the inspection system 174 and deliver the completed parts to the part box 194.

The return bend ringing system 110 illustrated in FIG. 1 may also include a pneumatic system 198 having components coupled to various portions of the base 114 or frame assembly 118. The pneumatic system 198 may include an air filter 202, a compressor, an accumulator, tubing, and various control valves that permit the controlled delivery of air to move components or parts associated with the return bend ringing system 110.

Figure 2:
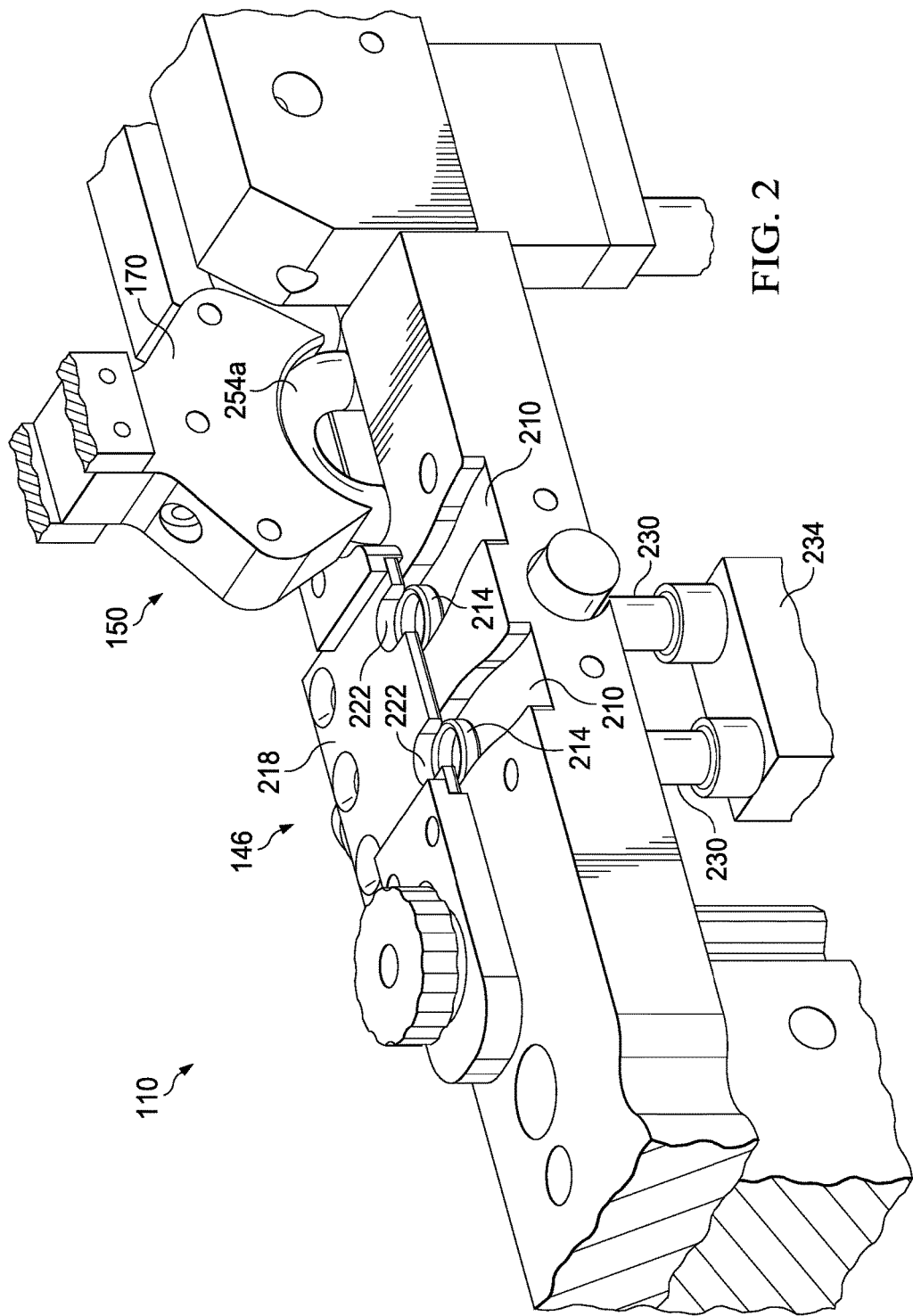
FIG. 2 illustrates an isometric view of a ringing station and a part station of the return bend ringing system of FIG. 1 in an operational configuration.

Referring now to FIGS. 2-8, the ringing station 146 and the part station 150 of the return bend ringing system 110 are illustrated in more detail. The ringing station 146 includes a pair of ring tracks 210 with each ring track 210 configured to receive a ring 214 delivered to the ring track 210 by the first ramp 143 coupled to the first feed bowl 130 (see FIG. 1). The rings 214 may be made from a variety of materials, but typically the rings are aluminum, copper, or some other metal. Each ring 214 is substantially circular in shape with a substantially circular opening, thereby resulting in each ring having an inner diameter or width and an outer diameter or width. Although the illustration in FIGS. 2-8 only shows a single pair of rings, rings that are fed by the first feed bowl 130 to the ring track 210 are typically abutting one another and arranged in two rows, with each row entering one of the ring tracks 210. Each row of rings is capable of being continuously advanced toward to the ring station due to the vibratory and gravitational forces acting on the rings near the first feed bowl 130, but also by air directed through air handling ports positioned in the first ramp 143. The air may be provided by the pneumatic system 198, which either oscillates delivery of the air to advance the rings or provides a continuous flow of air. In either event, the rings continue to advance to the ring tracks 210 until the pair of rings 214 is positioned as illustrated in FIG. 2.

Figure 3:
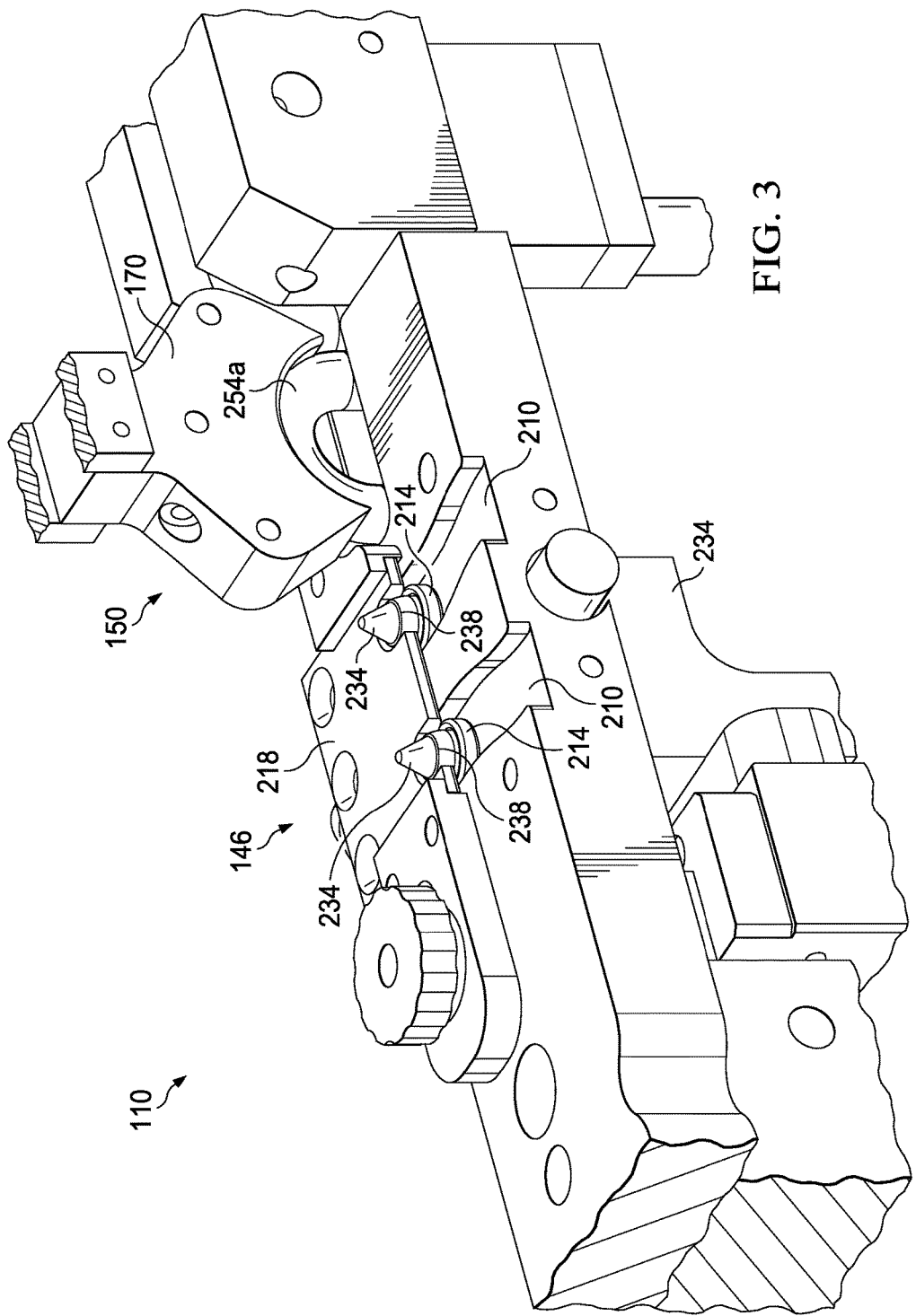
FIG. 3 illustrates an isometric view of a ringing station and a part station of the return bend ringing system of FIG. 1 in an operational configuration.
Figure 4:
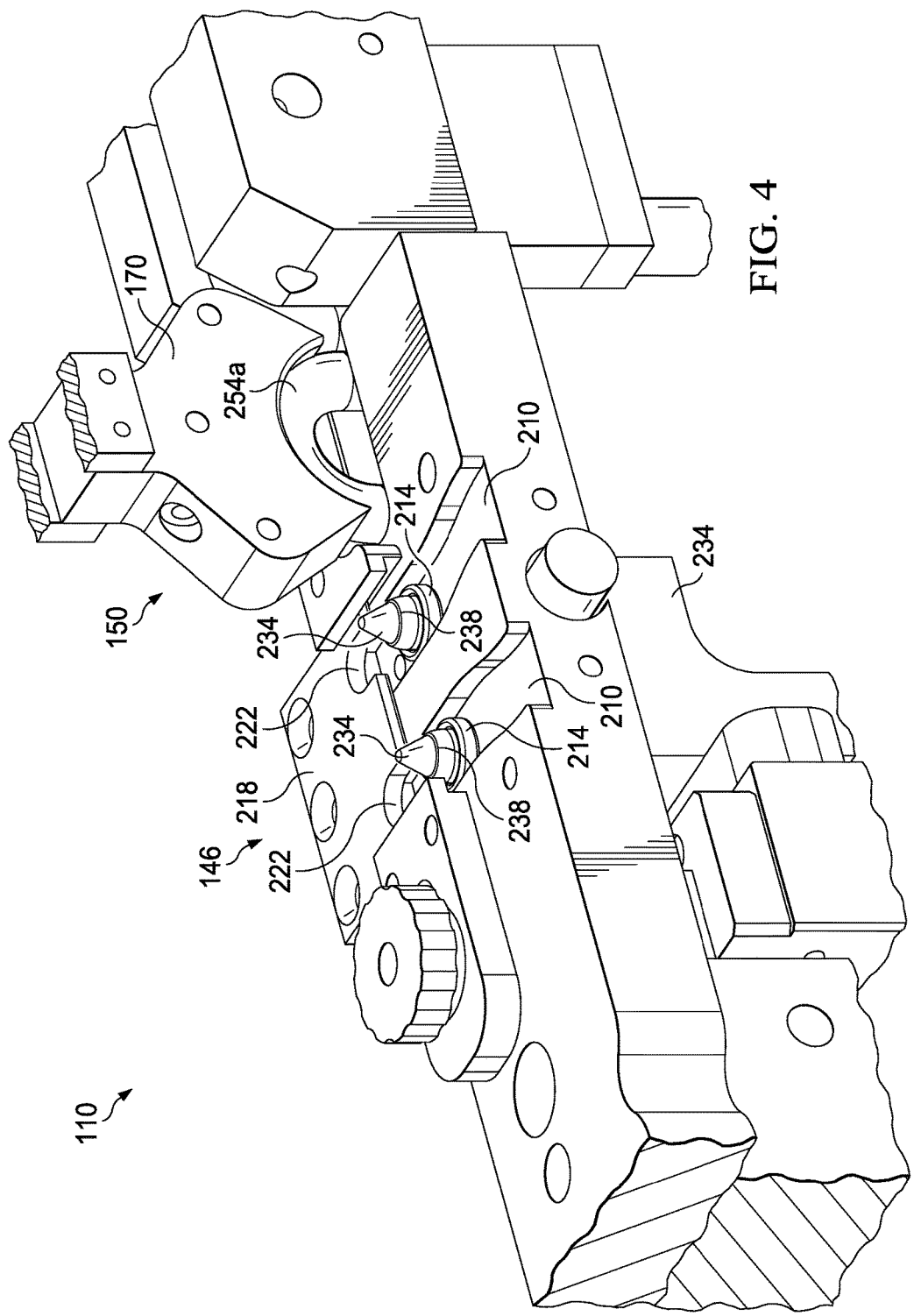
FIG. 4 illustrates an isometric view of a ringing station and a part station of the return bend ringing system of FIG. 1 in an operational configuration.

A cover plate 218 is provided at the ringing station 146 and is configured to reciprocate between an open position as illustrated in FIG. 4 and a closed position as illustrated in FIGS. 2 and 3. The cover plate 218 may be coupled to an air cylinder 220 or other actuator to drive the cover plate 218 between the closed position and the open position. The air cylinder 218 is operably associated with the pneumatic system 198. The cover plate 218 in the closed position assists in securing the pair of rings 214 at the ringing station 146. In some embodiments, the cover plate 218 in the closed position may provide a backstop for the rings 214 to prevent the rings from advancing further in the ring tracks 210. The cover plate 218 is generally planar and includes a pair of openings 222, each opening positioned over one of the ring tracks 210. The width of each opening 222 may be smaller than the outer diameter or width of the ring 214. The width of the opening, however, is larger than the inner diameter or width of the ring 214. This sizing of the openings 222 allows the cover plate to prevent the rings 214 from exiting the ring tracks 210 when forces are exerted on the rings 214. In the open position illustrated in FIG. 4, the cover plate 218 no longer obstructs or impedes movement of the rings 214.

Each ring track 210 includes an aperture 226 extending through a bottom surface of the ring track 210. The aperture 226 is positioned beneath the ring 214 when the ring 214 is positioned in a home position as illustrated in FIG. 2. More specifically, the aperture 226 is aligned with the opening in the ring 214 when the ring 214 has been stopped in the ring track 210 by either the cover plate 218 or a stop beneath the cover plate. The diameter or width of the aperture 226 may be at least as large as the inner diameter of the ring 214. Each aperture 226 is configured to receive a pin 230, and the pair of pins 230 is configured to move between a retracted position (FIG. 2) and an extended position (FIG. 3). The pins 230 are coupled to a carrier block 234, which may be driven by an air cylinder (not shown) or other actuator between the retracted position and the extended position. The pneumatic cylinder may act as a spring to resist movement of the pair of pins 230 between the extended position and the retracted position.

In one embodiment, each pin 230 is sized with a maximum diameter or width that is less than the aperture 226 and the inner diameter of the ring 214. This allows the pin 230 to extend through the aperture 226 and the ring 214 as the pin 230 is moved into the extended position. Referring to FIG. 4, each pin 230 may include a tapered end 234 and a shoulder 238. The tapered end 234 of the pin 230 ensures that the pin 230 is able to penetrate the opening of the ring 214 even if the ring 214 is slightly out of the home position. The tapered end 234 assists in centering the ring 214 on the pin 230 as the pin 230 moves through the opening of the ring 214. The shoulder 238 of each pin 230 provides a surface which a return bend 242 may engage as the return bend 242 is moved into position to begin the ringing process. The return bend 242 includes an inner passage (not shown) that defines an outer diameter or width and an inner diameter or width at each end of the return bend 242. In one embodiment, the diameter or width of the shoulder 238 is slightly larger than the inner diameter of the return bend 242, which allows the end of the return bend to 242 to engage the shoulder 238 of the pin 230.

Figure 5A:
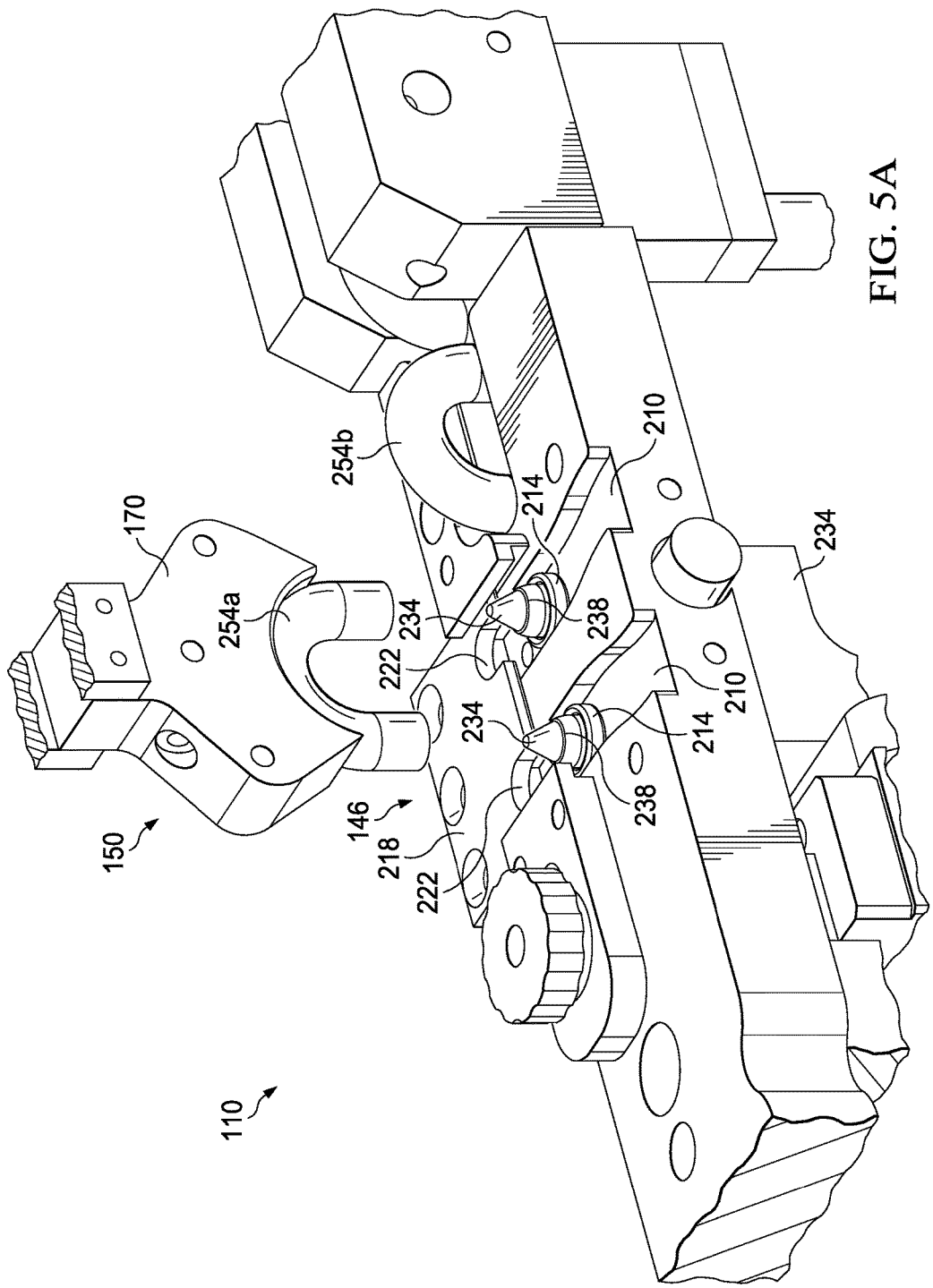
FIG. 5A illustrates an isometric view of a ringing station and a part station of the return bend ringing system of FIG. 1 in an operational configuration.
Figure 5B:
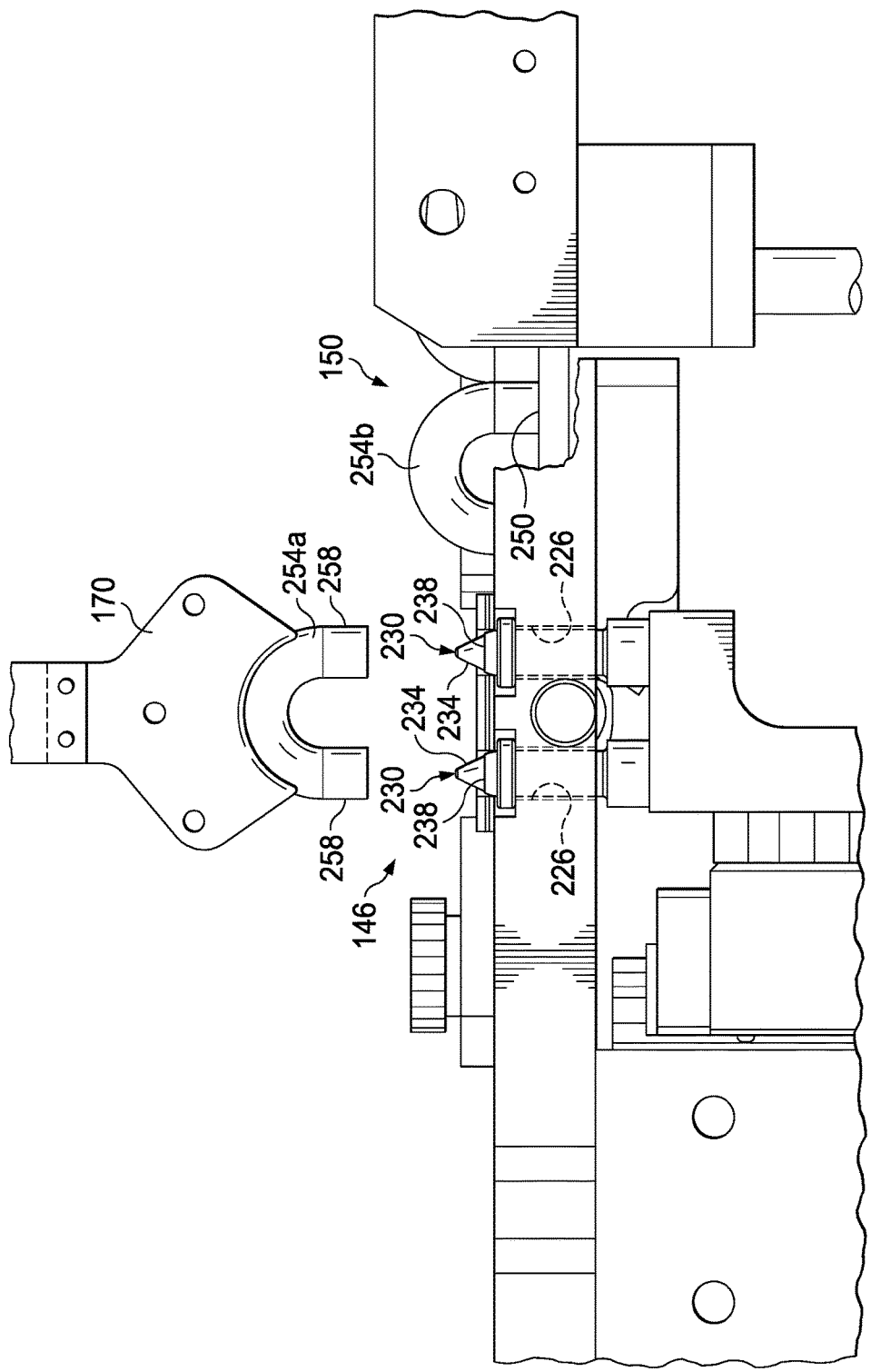
FIG. 5B illustrates a front view of the return bend ringing system in the operational configuration of FIG. 5A.

Referring more specifically to FIG. 5B, the part station 150 of the return bend ringing system 110 includes a track 250 that receives a return bend 254 that is fed to the track 250 by the second ramp 144 coupled to the second feed bowl 138 (see FIG. 1). Like the rings 214, the return bends 254 may be made from a variety of materials, but typically the return bends 254 are formed from aluminum, copper, or some other metal. Each return bend 254 is a u-shaped tube that includes a pair of legs 258 and an inner passage. The return bend 254 may be substantially circular in cross-section. The return bends 254 are each fed in a single row to the track 250 and such that adjacent return bends 254 abut one another but are arranged in similar orientations. More specifically, the return bends 254 are each oriented such that the legs 258 of the return bend 254 are each supported by (and move along) the track 250. The return bends 254 are advanced along the track 250 toward the part station 150 by the vibratory and gravitational forces acting on the return bends 254 near the second feed bowl 138, but also by air directed through air handling ports positioned in the second ramp 144. The air may be provided by the pneumatic system 198, which either oscillates delivery of the air to advance the return bends 254 or provides a continuous flow of air. In either event, each return bend 254 continues to advance to the track 250 until the return bend is positioned in a home position as illustrated in FIG. 5B. The return bend in the home position in FIG. 5B has been designated as return bend 254b, while the return bend held by the gripper 170 is designated as return bend 254a.

Referring to FIG. 5C, the part station 150 is illustrated in a partial cutaway view to better illustrate the home position of the return bend 254b and also a presence and obstruction detection system 262 that is employed to ensure that each return bend 254 is present in the home position and is free of obstruction prior to the ringing process being performed. Obstructions could be caused by the presence of foreign materials inside the inner passage of the return bend 254, or may in some cases be caused by a defective return bend 254 that has been crimped or otherwise damaged, thereby obstructing a portion of the inner passage. In one embodiment, the obstruction detection system 264 may include a detectable source 268, such as a light source, and a detector 272, such as a light detector. The detectable source 268 and the detector 272 are positioned proximate, or in at least one embodiment beneath, the track 150 such that each is operatively aligned or associated with one or more openings 276 in the track 150. In the embodiment illustrated in FIG. 5C, separate openings 276 are provided beneath each leg 258 of the return bend 254b. The openings 276 provide unimpeded communication or connection with the inner passage of the return bend 254b. When the detectable source 268 and the detector 272 comprise a light source and light detector, the light source, which may include fiber optic components, emits light into the inner passage of the return bend 254b. The light detector, which also may include fiber optic components, receives the light and loops it back through a control unit 280 that reads the amount of light returned. If the light returned meets a threshold amount, the control unit 280 is capable of sending a signal to indicate that the return bend 254b has reached the home position and is free from obstructions. In one embodiment, the signal is a 24V signal. The sending of this signal used to signal other components and systems in the return bend ringing system 110 that the next stage of the ringing process may be performed. As an example, the signal may be transmitted to the controller 162 of the robotic assembly 154 to effectuate movement of the arm 166 such that the gripper 170 is moved into engagement with and grips the return bend 254b.

The presence and obstruction detection system 262 detects a blockage in the inner passage of the return bend 254b, which is an advantage to end users of any ringed return bends. However, the presence and obstruction detection system 262 also is capable of stalling the return bend ringing system 110 if there is an issue with the return bends 254 being fed from the second feed bowl 138 causing them to either be slow feeding or completely stopped. This prevents the robotic assembly 154 from continuing to operate, possibly damaging parts, or jamming the ringing operations when a return bend is not properly seated in the home position.

While the detectable source 268 and the detector 272 have been described as a light source and a light detector, respectively, alternative sources or detectors may be used to check for presence or blockages. For example, a pneumatic source could be employed instead of a light source, and an air sensor, mass flow sensor or velocity sensor instead of a light detector. In such a system, an injection of air through the inner passage of the return bend 254b may be measured by such detectors to determine the presence, amount, or velocity of air received. Such measurements, when compared to calibrated values, may be used to determine the proper positioning of the return bend 254b or if blockages are present. Still other alternatives exist, including without limitation weight sensors and weight detectors.

Referring still to FIGS. 2-8, the operation of the return bend ringing system 110 is described in more detail. In FIG. 2, rings 214 have been delivered via the ring tracks 210 to the home position, and the cover plate 218 is positioned in the closed position. The cover plate 218 in this configuration assists in securing the rings 214 in the home position. When the cover plate 218 is closed, the openings 222 of the cover plate 218 are positioned over the openings of the rings. The pair of pins 230 in FIG. 2 is illustrated in the retracted position which further ensures that the rings 214 move unimpeded to the home position. At the part station 150, the return bend 254a has been delivered via the track 250 to the home position. Upon receipt of the return bend 254a in the home position, the presence and obstruction detection system 262 operates as described previously to ensure proper positioning of the return bend 254a and to ensure that the inner passage of the return bend 254a does not include any obstructions. Upon receiving a signal at control unit 280 indicating proper positioning and a lack of obstructions, the motor 158 of the robotic assembly 154 is used to move the gripper 170 to engage the return bend 254a at the home position.

Referring to FIG. 3, at the ringing station 146, the cover plate 218 remains in the closed position and the pins 230 are moved into the extended position such that the tapered ends 234 and the shoulders 238 of the pins extend through the openings of the rings 214. As the pins 230 are moved into the extended position, the tapered surfaces allow the rings 214 to be properly centered about the pins 230 if the rings 214 are slightly out of position prior to extension of the pins 230. During the extension of the pins 230, the closed cover plate 218 ensures that the rings 214 do not lift away from the ring track 210. After extension of the pins 230 into the extended position, a signal is transmitted to advance the ringing operation by opening the cover plate 218. In FIG. 4, the cover plate 218 is moved to the open position. This operation does not affect the positioning of the rings 214, which remain seated on the ring track 210 and centered upon the pins 230. During this operation, the gripper 170 remains engaged to the return bend 254a. Upon the opening of the cover plate 218, a signal is sent to advance the ringing operation by moving the gripper 170 and the return bend 254a to a pre-engagement position as illustrated in FIGS. 5A and 5B. At the ringing station 146 in FIGS. 5A and 5B, the pins 230 remain extended and the cover plate 218 remains in the open position. The pre-engagement position of the gripper 170 aligns the legs 258 of the return bend 254a with the openings of the rings 214. At the part station 150, the next return bend 254b advances to the home position where it resides until the ringing process of return bend 254a is completed.

Figure 6A:
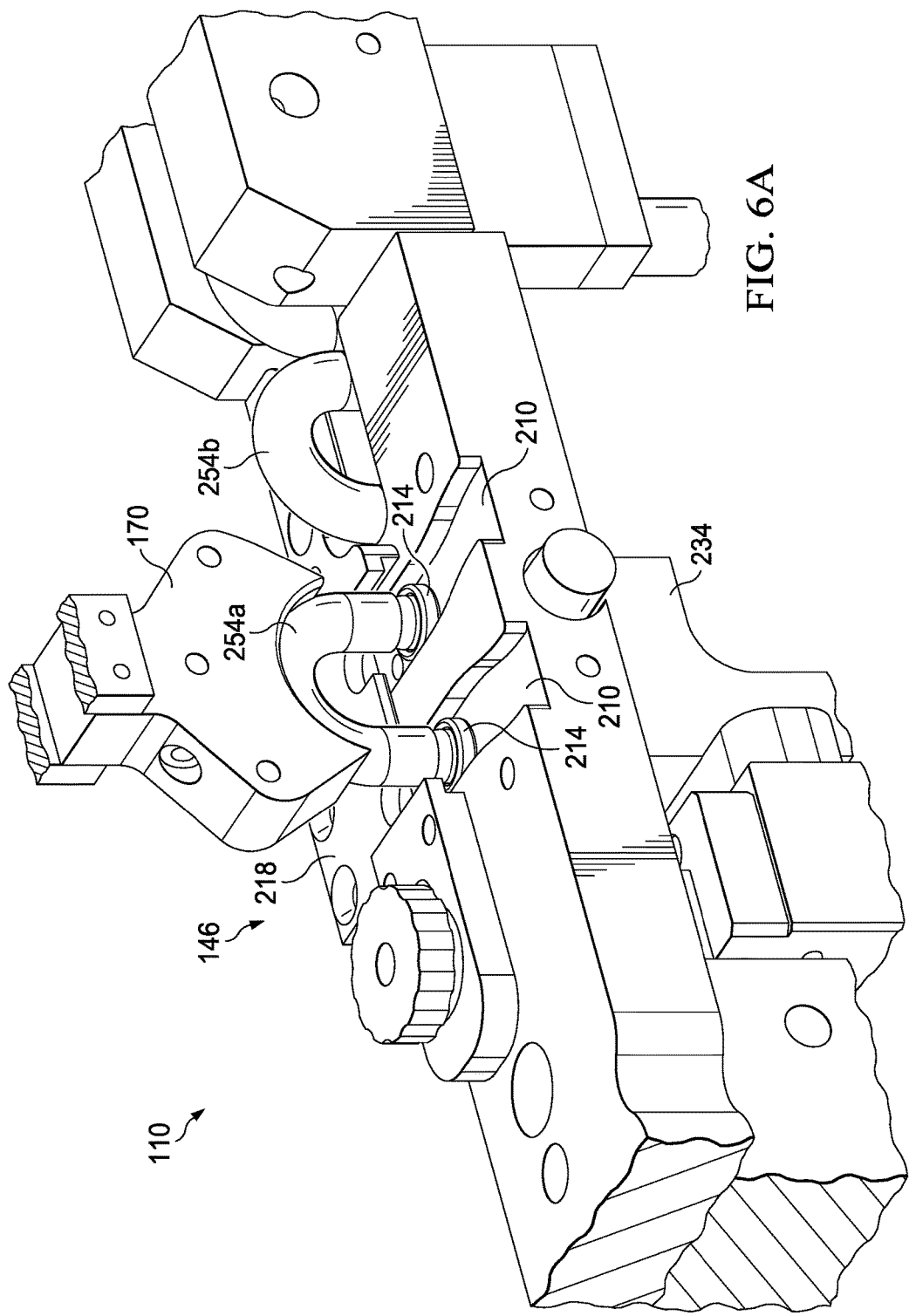
FIG. 6A illustrates an isometric view of a ringing station and a part station of the return bend ringing system of FIG. 1 in an operational configuration.
Figure 6B:
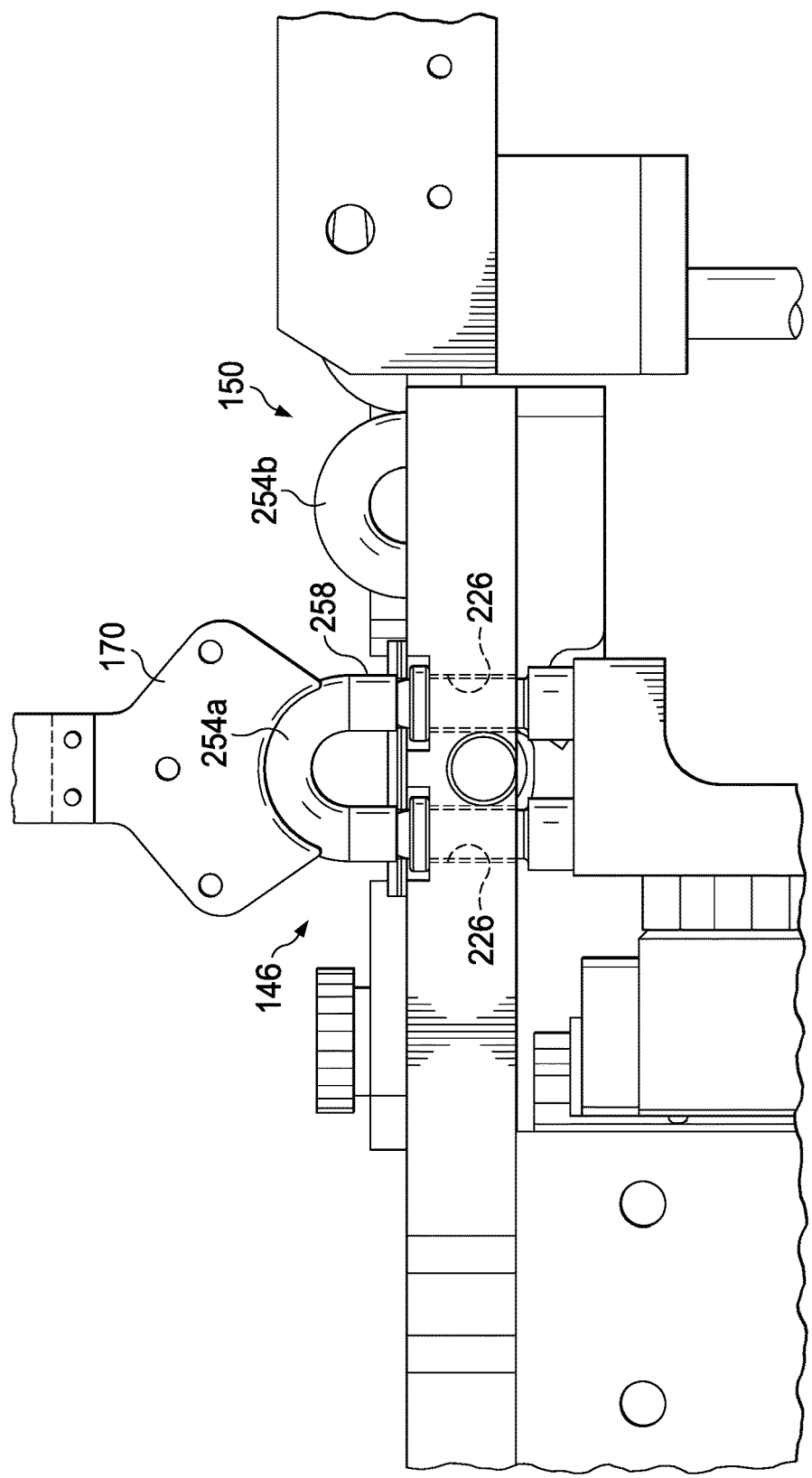
FIG. 6B illustrates a front view of the return bend ringing system in the operational configuration of FIG. 6A.

Referring to FIGS. 6A and 6B, the pins 230 remain extended and the cover plate 218 remains in the open position. The gripper 170 is used to move the return bend 254a into an engagement position in which each leg 258 of the return bend 254a engages the shoulder 238 of each pin 230. The engagement of the shoulders 238 by the return bend 254a is best illustrated in FIG. 6B. In this position, the return bend 254a does not yet contact the rings 214 but instead rest upon the shoulders 238 above the rings 214. The tapered ends 234 of the pins 230 serve to center and align the legs 258 of the return bend 254a with the openings in the rings.

Referring to FIGS. 7A and 7B, the cover plate 218 remains in the open position, and the gripper 170 is used to move the return bend 254a into the ringed position. In the ringed position, which is best illustrated in FIG. 7B, each leg 258 of the return bend 254a is pushed through and is received by the rings 214. As the return bend 254a is moved from the engagement position to the ringed position, the pins 230 (and the pneumatic cylinder that drives the pins 230) act as an air spring to cushion and resist the downward force imposed on the return bend 254a by the gripper 170. This cushioning allows more measured control over the return bend 254a as it is received by the rings 214. When the pins 230 have been retracted by the ringing process, a signal is transmitted indicating that the return bend 254a has been ringed. The signal may be sent following movement of the gripper 170 to a particular location along the z-axis, which is parallel to the direction of movement of the pins 230.

Figure 8A:
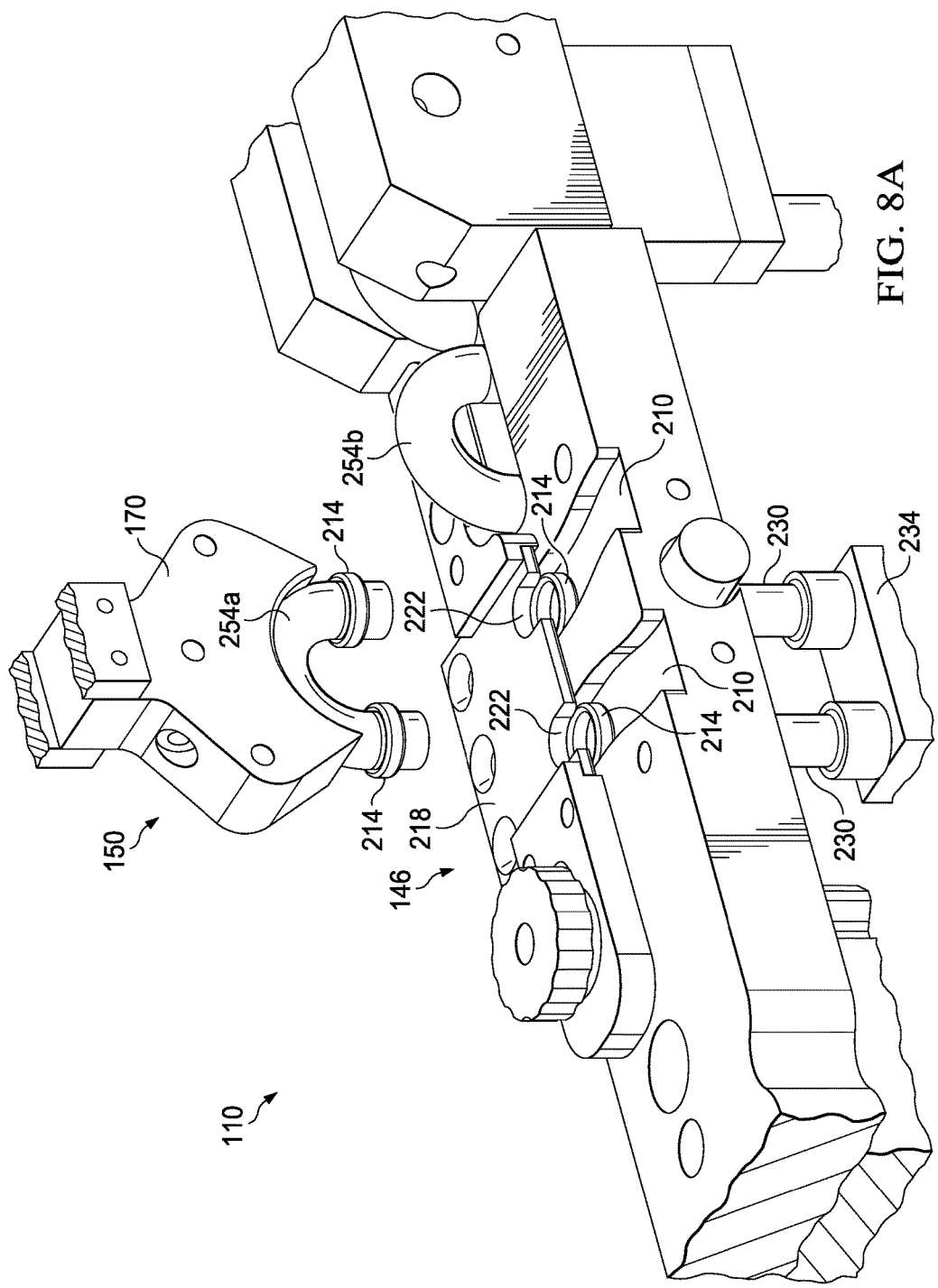
FIG. 8A illustrates an isometric view of a ringing station and a part station of the return bend ringing system of FIG. 1 in an operational configuration.
Figure 8B:
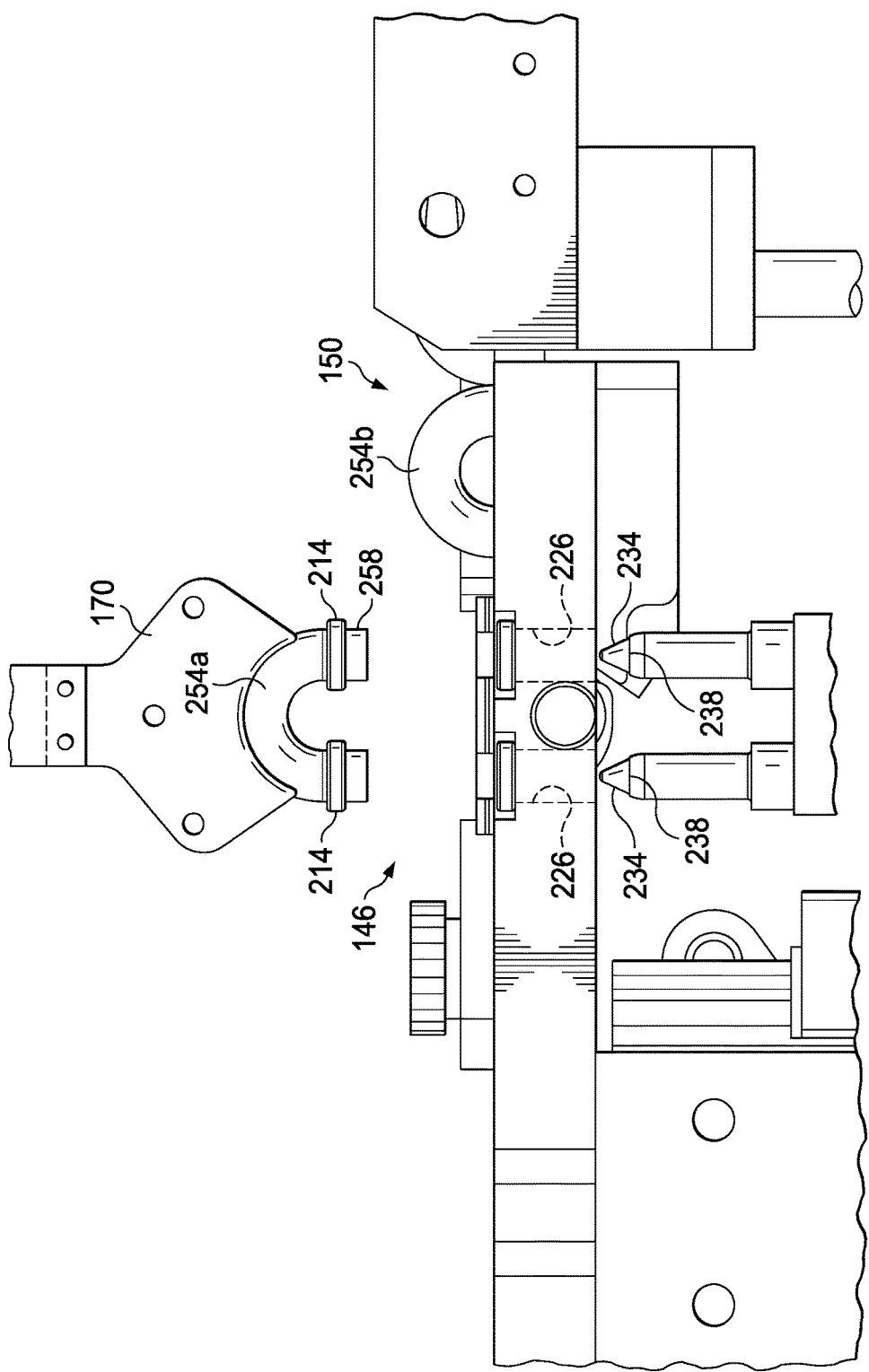
FIG. 8B illustrates a front view of the return bend ringing system in the operational configuration of FIG. 8A.

Referring to FIGS. 8A and 8B, the gripper 170 moves the now-ringed return bend 254a to an inspection position in which the inspection system 174 is able to inspect the part. More specifically, the ringed return bend 254a in the inspection position is held between the camera 178 and the light source 182 (see FIG. 1). The camera 178 captures an image of the ringed return bend 254a such that the image may be compared to a stored image of an acceptable part. The comparison may be made by the processor 186, or alternatively by another processor not necessarily associated with the camera 178. Alternatively, geometrical measurements or relationships associated with the captured image may be discerned by the processor and compared to threshold values to determine if the ringed return bend 254a is acceptable.

The repeatable and consistent positioning of the return bends 254 during inspection improves the quality control of the return bend ringing system 110. Since each image captured of a completed return bend is positioned and oriented the same, less processing power and time is required to compare the completed return bend to stored reference parameters. In addition, the consistent positioning allows the optimum image of the completed return bend to be captured, which lessens the likelihood that flaws in a completed part are overlooked.

Upon a determination being made that the ringed return bend 254a is acceptable, the gripper moves and drops the ringed return bend into the part chute 196 to be delivered to the part box 194. If instead, the inspection system 174 determined that the ringed return bend 254a was unacceptable, the gripper 170 moves and drops the ringed return bend 254a into the reject chute 192 to be delivered to the part box 190. Many reasons exists that could cause the rejection of a ringed return bend, including misalignment of the rings on the return bend, incorrect positioning of the rings on the return bend, or damage to either of the rings or the return bend itself.

Referring still to FIGS. 8A and 8B, after the ringed return bend 254a is moved from the ringing station 146 to the inspection position, the cover plate 218 is immediately placed in the closed position and the pins 230 remain in the retracted position, which allows new rings 214 to be received at the home position in the ring track 210. The ringing process then begins again with the ringing station 146 and the part station 150 being placed in an operational configuration similar to that of FIG. 2.

While several positions are mentioned with respect to the cover plate, the pins, the rings, the return bend, and the gripper, it should be understood that a plurality of intermediate positions may exist between each of the named positions, and that not necessarily every position referred to herein is required for completing the ringing process. It should further be recognized that the various positions do not necessarily represent locations at which a given part is paused or held for a selected period of time. For example, while the return bend may wait for a period of time in the home position while the previously ringed return bend is inspected, there may be no pause or delay when a return bend first engages the shoulders of the pins in the engagement position.

The return bend ringing system described herein improves the manufacturing and assembly of ringed return bends. The following examples represent additional embodiments of the return bend ringing system and method.

Example 1

A return bend ringing apparatus comprising:
a ring station configured to receive a pair of rings;
a cover plate configured to reciprocate between an open position and a closed position, the cover plate in the closed position assisting in securing the pair of rings at the ring station;
a pair of pins configured to move between a retracted position and an extended position, each pin having a tapered end and a shoulder, the pins in the retracted position configured not to engage the rings, the pins in the extended position configured to engage the rings with each pin extending through one of the rings; and
a gripper configured to selectively grip a return bend, the gripper configured to move the return bend between a home position and an engagement position in which the return bend engages the shoulder of each pin.

Example 2

The return bend ringing apparatus of example 1, wherein the gripper is further configured to move the return bend to into a ringed position in which each leg of the return bend is received by one of the pair of rings.

Example 3

The return bend ringing apparatus of example 1 or 2 further comprising a light source proximate the ring station, and a camera operably associated with the light source to capture an image of a return bend following application of the rings to the return bend.

Example 4

The return bend ringing apparatus of any of examples 1-3 further comprising a pneumatic cylinder coupled to the pair of pins to move the pins between the retracted position and the extended position.

Example 5

The return bend ringing apparatus of example 4, wherein the pneumatic cylinder acts as a spring to resist movement of the pair of pins between the extended position and the retracted position.

Example 6

The return bend ringing apparatus of any of examples 1-5 further comprising a robotically controlled arm connected to the gripper to move and operate the gripper.

Example 7

The return bend ringing apparatus of any of examples 1-6, further comprising a controller, the controller configured to:

receive a first signal indicating at least one of (1) the presence of the pair of rings at the ring station, (2) the positioning of the cover plate in the closed position, and (3) the presence of the return bend; and after receiving the first signal, send a second signal to move the pair of pins to the extended position.

Example 8

The return bend ringing apparatus of example 7, wherein the controller is further configured to send a third signal to grip the return bend and move the return bend from the home position to the engagement position.

Example 9

A method of ringing a return bend comprising:
moving a pin through a ring and into an extended position to position the ring to receive a leg of the return bend;
moving the return bend to engage the pin with the leg of the return bend;
continuing to move the pin toward a retracted position by moving the return bend such that the leg of the return bend is received by the ring.

Example 10

The method of example 9 further comprising moving the ringed return bend to an image capture area, and capturing an image of the ringed return bend.

Example 11

The method of example 10 further comprising illuminating the ringed return bend prior to capturing the image.

Example 12

The method of example 10 or 11 further comprising ensuring that the orientation of the ringed return bend is the same as the orientation of a prior ringed return bend prior to capturing the image.

Example 13

The method of example 12, wherein the orientation of the return bend is the same as the orientation of the return bend as the return bend is being received by the ring.

Example 14

The method of any of examples 9-13 further comprising:
moving a second pin through a second ring and into an extended position to position the second ring to receive a second leg of the return bend;
moving the return bend to engage the second pin with the second leg of the return bend;
continuing to move the second pin toward a retracted position by moving the return bend such that the second leg of the return bend is received by the second ring.

Example 15

The method of example 14, wherein the movement of the first and second pins through the first and second rings is performed simultaneously.

Example 16

The method of example 15, wherein the engagement of the first and second pins by the first and second legs of the return bend occurs simultaneously.

Example 17

The method of any of examples 9-16 further comprising:
inspecting the ringed return bend and determining whether the ringed return bend is acceptable or unacceptable;
moving the ringed return bend into a first bin if the ringed return bend is acceptable; moving the ringed return bend into a second bin if the ringed return bend is unacceptable.

Example 18

A return bend ringing apparatus comprising:
a ring station configured to receive a pair of rings;
a pair of pins configured to move between a retracted position and an extended position, each pin having a tapered end and a shoulder, the pins in the retracted position configured not to engage the rings, the pins in the extended position configured to engage the rings with each pin extending through one of the rings; and
a gripper configured to grip and move a return bend into an engagement position in which the return bend engages the shoulder of each pin.

Example 19

The return bend ringing apparatus of example 18, wherein the gripper is further configured to move the return bend to into a ringed position in which each leg of the return bend is received by one of the pair of rings.

Example 20

The return bend ringing apparatus of example 18 or 19 further comprising a light source proximate the ring station, and a camera operably associated with the light source to capture an image of a return bend following application of the rings to the return bend.

Example 21

The return bend ringing apparatus of example 20, wherein the gripper is further configured to move the return bend to an acceptable bin or a rejected bin depending on a comparison of the image to a reference image.

Example 22

The return bend ringing apparatus of any of examples 18-21 further comprising a pneumatic cylinder coupled to the pair of pins to move the pins between the retracted position and the extended position.

Example 23

The return bend ringing apparatus of example 22, wherein the pneumatic cylinder acts as a spring to resist movement of the pair of pins between the extended position and the retracted position.

Example 24

A return bend ringing apparatus comprising:
a part station configured to receive a return bend having an inner passage with a first opening and a second opening;
a light source configured to direct a light into the first opening of the inner passage;
a light detector configured to detect the light near the second opening;
a controller configured to determine based on the light detected near the second opening at least one of (1) the proper positioning of the return bend at the part station, and (2) the absence of blockages in the inner passage of the return bend.

The return bend ringing system may further include alarms, lights or other indicators that alert an operator in the event that a delay or problem in processing occurs. One example would be due to a delay or non-receipt of a signal that is expected to advance the ringing process. While the return bend ringing system is described herein as providing a component of a heat exchanger used in a residential or commercial heating or cooling system, the ringed return bends may also be used in the radiators of automobiles, or other vehicles or equipment that require engine cooling.

It should be apparent from the foregoing disclosure of illustrative embodiments that significant advantages have been provided. The illustrative embodiments are not limited solely to the descriptions and illustrations included herein and are instead capable of various changes and modifications without departing from the spirit of the disclosure.

I claim:

1. A return bend ringing apparatus comprising:
a ring station configured to receive a pair of rings;
a cover plate configured to reciprocate between an open position and a closed position, the cover plate in the closed position assisting in securing the pair of rings at the ring station;
a pair of pins configured to move between a retracted position and an extended position, each pin having a tapered end and a shoulder, the pins in the retracted position configured not to engage the rings, the pins in the extended position configured to engage the rings with each pin extending through one of the rings; and
a gripper configured to selectively grip a return bend, the gripper configured to move the return bend between a home position and an engagement position in which the return bend engages the shoulder of each pin.

2. The return bend ringing apparatus of claim 1, wherein the gripper is further configured to move the return bend to into a ringed position in which each leg of the return bend is received by one of the pair of rings.

3. The return bend ringing apparatus of claim 1 further comprising:
a light source proximate the ring station; and
a camera operably associated with the light source to capture an image of a return bend following application of the rings to the return bend.

4. The return bend ringing apparatus of claim 1 further comprising:
a pneumatic cylinder coupled to the pair of pins to move the pins between the retracted position and the extended position.

5. The return bend ringing apparatus of claim 4, wherein the pneumatic cylinder acts as a spring to resist movement of the pair of pins between the extended position and the retracted position.

6. The return bend ringing apparatus of claim 1 further comprising a robotically controlled arm connected to the gripper to move and operate the gripper.

7. The return bend ringing apparatus of claim 1, further comprising a controller, the controller configured to:
receive a first signal indicating at least one of (1) the presence of the pair of rings at the ring station, (2) the positioning of the cover plate in the closed position, and (3) the presence of the return bend; and
after receiving the first signal, send a second signal to move the pair of pins to the extended position.

8. The return bend ringing apparatus of claim 7, wherein the controller is further configured to:
send a third signal to grip the return bend and move the return bend from the home position to the engagement position.

9. A return bend ringing apparatus comprising:
a ring station configured to receive a pair of rings;
a pair of pins configured to move between a retracted position and an extended position, each pin having a tapered end and a shoulder, the pins in the retracted position configured not to engage the rings, the pins in the extended position configured to engage the rings with each pin extending through one of the rings; and
a gripper configured to grip and move a return bend into an engagement position in which the return bend engages the shoulder of each pin.

10. The return bend ringing apparatus of claim 9, wherein the gripper is further configured to move the return bend to into a ringed position in which each leg of the return bend is received by one of the pair of rings.

11. The return bend ringing apparatus of claim 9 further comprising:
a light source proximate the ring station; and
a camera operably associated with the light source to capture an image of a return bend following application of the rings to the return bend.

12. The return bend ringing apparatus of claim 11, wherein the gripper is further configured to move the return bend to an acceptable bin or a rejected bin depending on a comparison of the image to a reference image.

13. The return bend ringing apparatus of claim 9 further comprising:
a pneumatic cylinder coupled to the pair of pins to move the pins between the retracted position and the extended position.

14. The return bend ringing apparatus of claim 13, wherein the pneumatic cylinder acts as a spring to resist movement of the pair of pins between the extended position and the retracted position.

15. A return bend ringing apparatus comprising:
a part station configured to receive a return bend having an inner passage with a first opening and a second opening;
a light source configured to direct a light into the first opening of the inner passage;
a light detector configured to detect the light near the second opening;
a controller configured to determine based on the light detected near the second opening at least one of (1) the proper positioning of the return bend at the part station, and (2) the absence of blockages in the inner passage of the return bend.

* * * * *